US008396938B2

(12) United States Patent
Oscherov et al.

(10) Patent No.: US 8,396,938 B2
(45) Date of Patent: Mar. 12, 2013

(54) PROVIDING DIRECT ACCESS TO DISTRIBUTED MANAGED CONTENT

(75) Inventors: Alex Oscherov, Danville, CA (US); Victor Spivak, San Mateo, CA (US); Eric Lundblad, Oakland, CA (US); Alex Treyger, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 1329 days.

(21) Appl. No.: 11/229,036

(22) Filed: Sep. 15, 2005

(65) Prior Publication Data

US 2007/0073831 A1    Mar. 29, 2007

(51) Int. Cl.
  *G06F 15/16*    (2006.01)
(52) U.S. Cl. ....................................................... 709/217
(58) Field of Classification Search .................. 709/223, 709/217
  See application file for complete search history.

(56) References Cited

U.S. PATENT DOCUMENTS

| | | | |
|---|---|---|---|
| 5,333,312 A * | 7/1994 | Wang ............................. | 707/611 |
| 6,389,422 B1 * | 5/2002 | Doi et al. ....................... | 707/784 |
| 6,757,712 B1 | 6/2004 | Bastian et al. | |
| 6,804,674 B2 | 10/2004 | Hsiao et al. | |
| 6,832,253 B1 | 12/2004 | Auerbach | |
| 6,879,998 B1 | 4/2005 | Raciborski et al. | |
| 7,139,811 B2 | 11/2006 | Lev Ran et al. | |
| 7,284,017 B2 | 10/2007 | Baune | |
| 7,340,571 B2 | 3/2008 | Saze | |
| 7,558,837 B1 | 7/2009 | Denny | |
| 7,761,572 B1 | 7/2010 | Auerbach | |
| 7,996,535 B2 | 8/2011 | Auerbach | |
| 2002/0198937 A1 | 12/2002 | Diwan et al. | |
| 2003/0050979 A1 * | 3/2003 | Takahashi ...................... | 709/204 |
| 2003/0065739 A1 * | 4/2003 | Shnier ............................ | 709/217 |
| 2003/0187956 A1 | 10/2003 | Belt et al. | |
| 2003/0229645 A1 * | 12/2003 | Mogi et al. .................... | 707/102 |
| 2004/0111398 A1 | 6/2004 | England et al. | |
| 2004/0148344 A1 * | 7/2004 | Navar et al. ................... | 709/219 |
| 2004/0216084 A1 * | 10/2004 | Brown et al. .................. | 717/102 |
| 2005/0010653 A1 * | 1/2005 | McCanne ...................... | 709/219 |
| 2005/0044260 A1 * | 2/2005 | Abramson et al. ............ | 709/233 |
| 2005/0120050 A1 | 6/2005 | Myka et al. | |
| 2005/0149575 A1 | 7/2005 | Baune | |
| 2005/0160154 A1 * | 7/2005 | Raciborski et al. ........... | 709/219 |
| 2005/0216524 A1 | 9/2005 | Gomes et al. | |
| 2005/0235282 A1 * | 10/2005 | Anderson ...................... | 717/178 |
| 2005/0246393 A1 * | 11/2005 | Coates et al. .................. | 707/200 |
| 2005/0267950 A1 * | 12/2005 | Kitamura ...................... | 709/219 |
| 2006/0041614 A1 | 2/2006 | Oe | |
| 2006/0053250 A1 | 3/2006 | Saze | |

(Continued)

OTHER PUBLICATIONS

U.S. Appl. No. 11/229,318, Oscherov et al.

(Continued)

*Primary Examiner* — Sulaiman Nooristany

(74) *Attorney, Agent, or Firm* — Van Pelt, Yi & James LLP

(57) ABSTRACT

A method for providing direct access to distributed managed content is disclosed. The method comprises receiving a request to perform an operation with respect to content associated with a set of managed content and obtaining information required to respond to the request. The method further comprises providing in response to the request one or more content locators, each content locator being usable to perform the requested operation through direct communication with an associated one of a plurality of content systems used to store at a portion of the distributed managed content.

28 Claims, 13 Drawing Sheets

U.S. PATENT DOCUMENTS

2006/0064536 A1* 3/2006 Tinker et al. ............... 711/100
2006/0080546 A1   4/2006 Brannon et al.
2006/0294223 A1* 12/2006 Glasgow et al. ............ 709/224
2008/0177803 A1   7/2008 Fineberg et al.

OTHER PUBLICATIONS

U.S. Appl. No. 11/229,317, Oscherov et al.
U.S. Appl. No. 11/823,608, Randall et al.

* cited by examiner

PROVIDING DIRECT ACCESS TO DISTRIBUTED MANAGED CONTENT

BACKGROUND OF THE INVENTION

Content management systems provide the capability of managing content including typically the ability to search a body of stored content for and retrieve particular content of interest. Additional functionality provided by a content management system may include, without, limitation, tracking revisions, versions, review, approvals, distribution, life cycle and retention policy information, file name, file type, file creator, application used to create, owner, and any other data and/or metadata associated with stored content. In a typical content management system, a request from a user to retrieve content, such as a particular file, version, or other stored object, results in the content management system obtaining the requested content from a content storage location, e.g., a content server, and providing the requested content to the user. Because the content management system has limited throughput, this middleman role limits the performance of data delivery to and from the content server or other storage location. It would be beneficial to be able to utilize the advantages of a content management system without suffering the performance limitations the content management system can impose.

BRIEF DESCRIPTION OF THE DRAWINGS

Various embodiments of the invention are disclosed in the following detailed description and the accompanying drawings.

DETAILED DESCRIPTION

Figure 1:
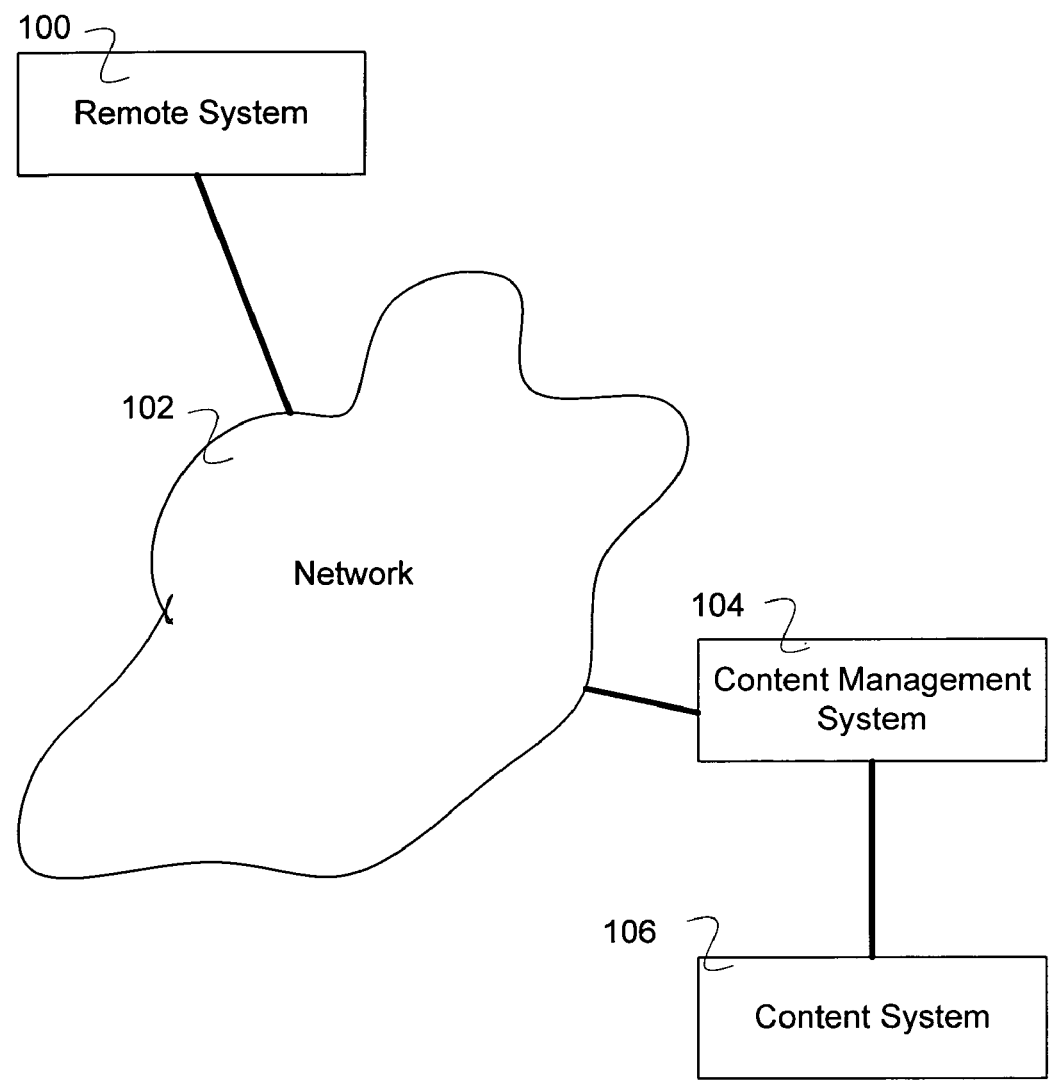
FIG. 1 is a block diagram illustrating a typical prior art system for providing access to managed content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing direct access to distributed managed content is disclosed. In some embodiments, a remote system sends to a content management system a request associated with particular content, such as a request to retrieve and/or store (write) particular content. Information required to respond to the request is obtained from a content system. A content locator, based at least in part on the information obtained from the content system, is provided to the remote system. The content locator enables the remote system to retrieve the requested content directly from a content system or directly write to a content system, as applicable, without the content first passing through the content management system. In some embodiments, the information required to respond to the request includes for one or more of a plurality of content systems associated with the content with which the request is associated—e.g., a plurality of content systems at which the content associated with the request is and/or can be stored—information required to respond to the request with data associated with that content system. In some embodiments, the plurality of content systems includes the content system from which the information required to respond to the request was obtained and one or more alternate content systems. In some embodiments, a preferred content system is selected and a content locator associated with just the selected content system is provided to the remote system. The selected content system is selected as the best to interact with the remote system based on criteria such as distance from the remote system, available bandwidth for the given selected content system, speed of access between the remote system and the selected content system, or any other relevant metric. In some embodiments, a plurality of content locators is provided, each content locator usable by the remote system to perform with respect to the content, through direct communication with a content system with which the content locator is associated, an operation associated with the request. In some embodiments, a prioritized list of content locators is provided, with a content locator associated with a preferred content system being listed first and other content locators being listed in order based on their relative desirability as a content system to service the request.

FIG. 1 is a block diagram illustrating a typical prior art system for providing access to managed content. In the example shown, remote system 100 is connected to network 102. Content management system 104 is connected to network 102 and content system 106. Remote system 100 may be geographically remote from or geographically near to content management system 104. Network 102 may be a local area network, a wide area network, a wireless network, a wired network, the internet, or any other network for connecting systems. Content management system 104 may be connected to content system 106 using a direct connection, a local area network, a wide area network, or any other network for connecting systems. In some embodiments, content management system 104 and content system 106 are both implemented in one physical computer system. In some embodiments, content system 106 is implemented in one or more physical computer systems which each include one or more storage devices. In a typical approach, a user of remote system 100 communicates to content management system 104 via network 102 a request to retrieve content. The request may be for a specific stored object, e.g., a file identified by a unique identifier, or search criteria—e.g., word processing documents authored by a specified person on a specified date—may be provided. If specific content is identified, content management system 104 typically retrieves the content from content system 106 and sends the content to remote system 100 via network 102. In the case of a less specific request, e.g., a query to locate content that satisfies one or more criteria specified in the request, the content management system 104 typically obtains from content system 106 data and/or metadata associated with those stored objects, if any, that satisfy the criteria. Content system 106 typically maintains a database comprising metadata associated with the managed content and uses the metadata to identify stored objects that satisfy the criteria defined by the requesting user. All or a portion of the data or metadata returned by the content system 106 to the content management system 104, or other data derived at least in part from the returned data, is provided by content management system 104 to remote system 100. A user may subsequently use the data provided to request retrieval of a particular stored object.

Figure 2:
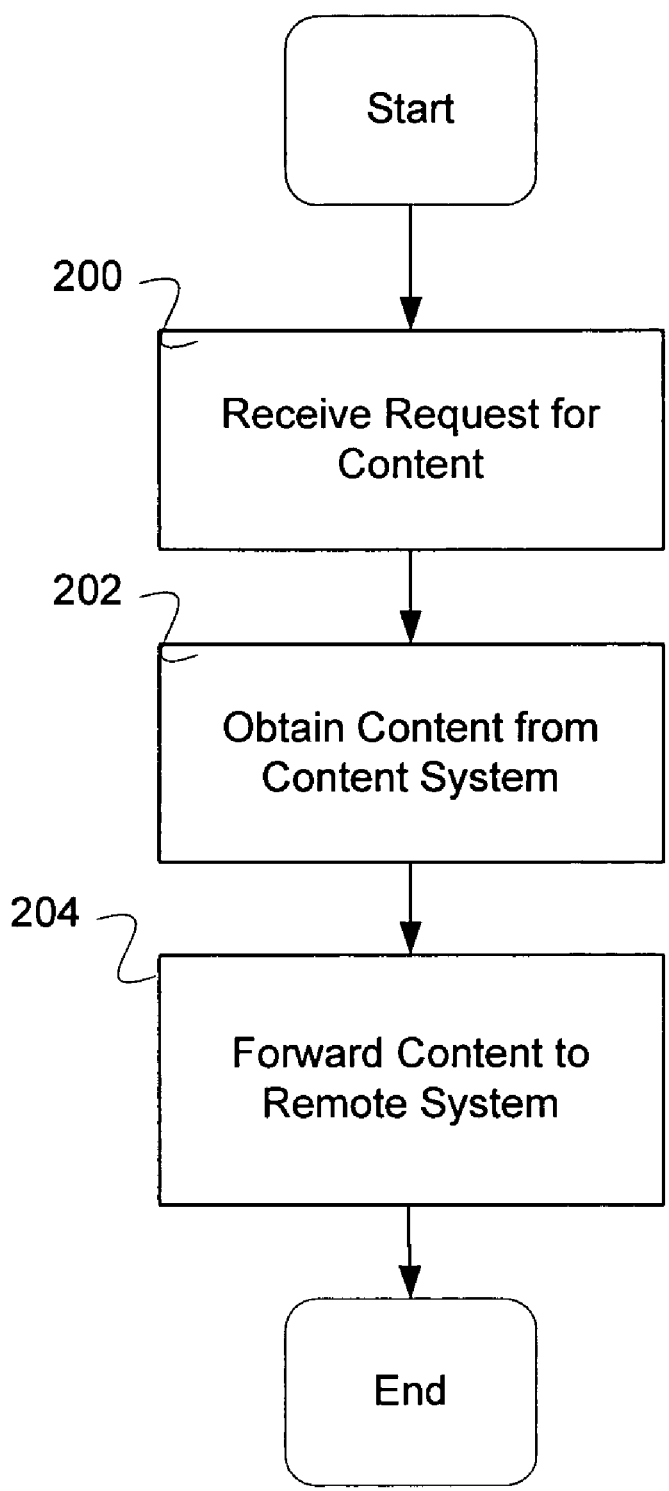
FIG. 2 illustrates an embodiment of a typical prior art process for providing access to managed content.

FIG. 2 illustrates an embodiment of a typical prior art process for providing access to managed content. In the example shown, in 200 a request for content is received at the content management system. In 202, the requested content is obtained by the content management system from the content system. In 204, the requested content is forwarded to the remote system from the content management system. As described above, the two step transfer approach shown in FIG. 2, in which requested content is first sent from the content system to the content management system and then sent by the content management system to the remote host that requested the content, can result in unwanted delay, especially in the case of large files and/or slow data transmission due to geographic remoteness of the remote host, limited transmission path capacity (bandwidth), high traffic, etc.

Figure 3:
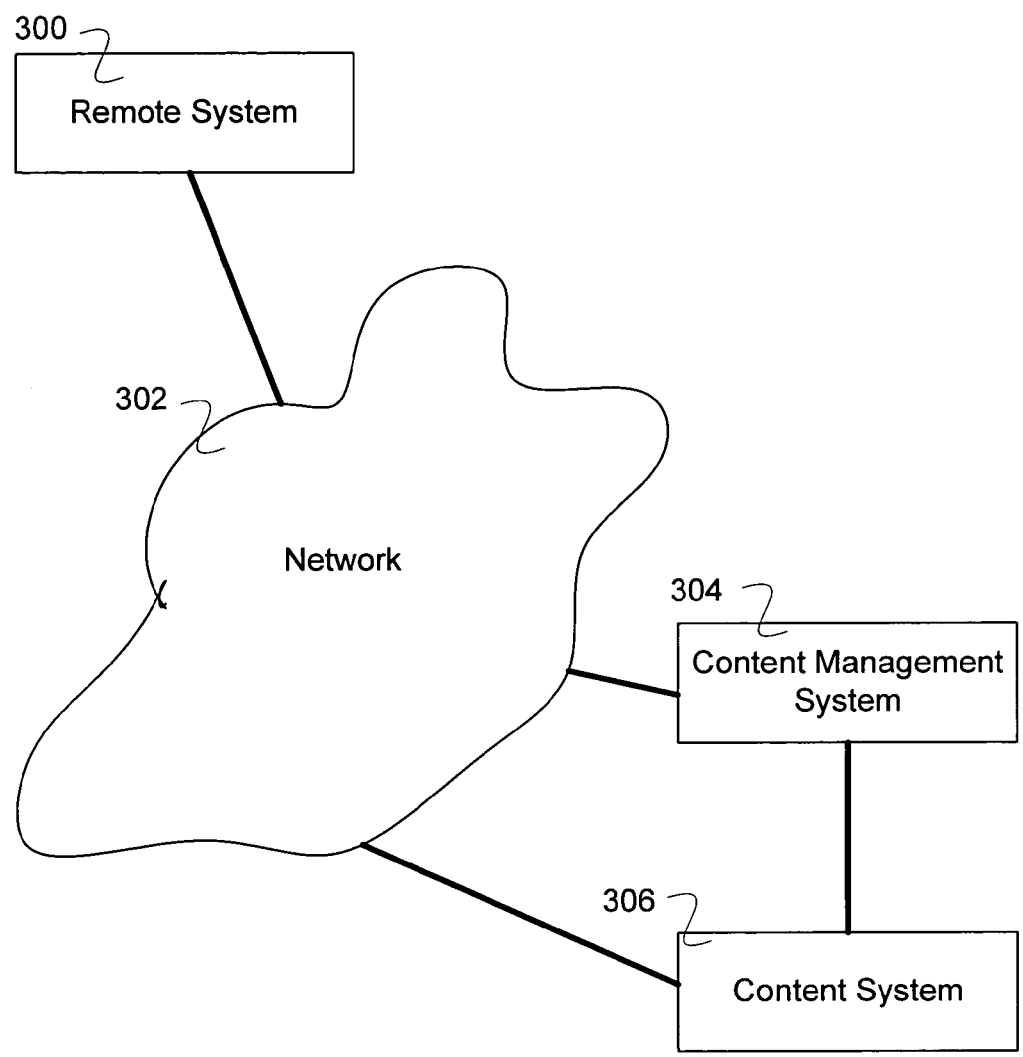
FIG. 3 is a block diagram illustrating an embodiment of a system for providing direct access to managed content.

FIG. 3 is a block diagram illustrating an embodiment of a system for providing direct access to managed content. In the example shown, remote system 300 is connected to network 302. In various embodiments, network 302 includes a local area network, a wide area network, a wireless network, a wired network, the internet, an intranet, and/or any other network for connecting systems. Content management system 304 is connected to network 302 and content system 306. Content system 306 is connected to content management system 304 and network 302. In various embodiments, content management system 304 is connected to content system 306 using a direct connection, a local area network, a wide area network, the internet, an intranet, and/or any other network for connecting systems. In some embodiments, content management system 304 does not have a connection to content system 306 except through network 302, and the content management system 304 and content system 306 exchange data via network 302. In some embodiments, content management system 304 and content system 306 are both implemented in one physical computer system. In various embodiments, remote system 300 is geographically remote from or geographically near to content management system 304. In some embodiments, remote system 300 is one of a plurality of hosts able to access content management system 304 via network 302. In some embodiments, content system 306 is implemented in one or more physical computer systems each of which includes one or more storage devices. In some embodiments, content management system 304 does not act as a middleman by obtaining requested content from content system 306 and forwarding the content on to the remote system 300. Instead, for at least some requests (e.g., for objects larger than a threshold size), the content management system 304 is configured to obtain from the content system 306, and content system 306 is configured to provide, data required by the content management system 304 to form a URL or other identifier, locator, etc. to be provided by the content management system 304 to the remote host 300 to enable the remote host 300 to obtain the requested content directly from the content system 306.

Figure 4:
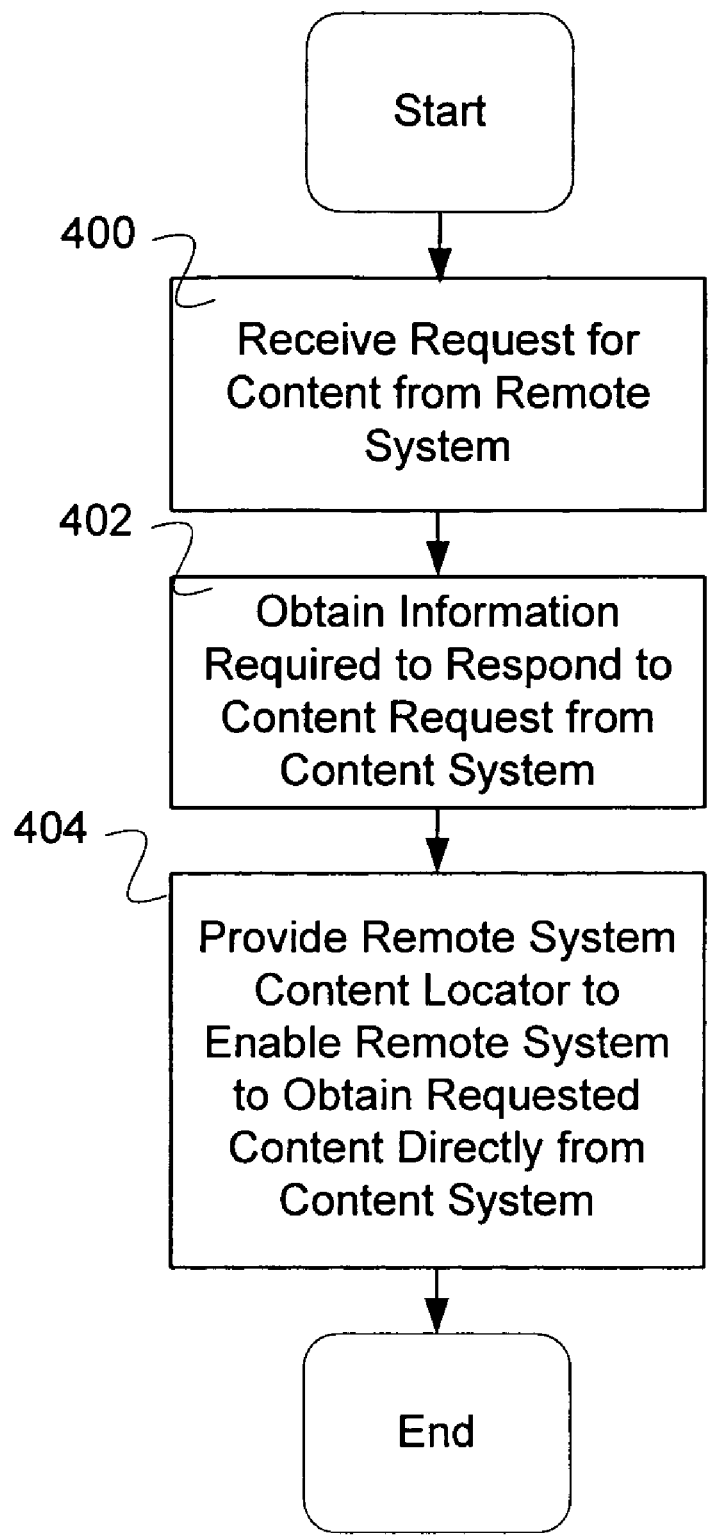
FIG. 4 illustrates an embodiment of a process for providing direct access to managed content.

FIG. 4 illustrates an embodiment of a process for providing direct access to managed content. In some embodiments, the process of FIG. 4 is implemented on a content management system, such as content management system 304 of FIG. 3. In the example shown, in 400 a request for content is received. In some embodiments, the request is received at a content management system from a remote system, e.g., from a browser, client, or other application running on the remote system. In 402, information required to respond to content request is obtained from a content system. In some embodiments, at 402 a content management system that received the request received at 400 sends to the content system a query associated with the requested content and receives response data from the content system. In 404, a content locator based at least in part on the information obtained in 402 is forwarded to the remote system from the content management system. The content locator enables the remote system to obtain the requested content directly from the content server by using the content locator, e.g., a URL, to request the content directly from the content server, without the content first passing through the content management system. In some embodiments, obtaining content directly includes data transfers through multiple intermediate nodes of a data communication network such as the internet, a local area network, a wide area network, or any other network for transferring data, with the transfer originating from the content server and terminating at the remote host without first being sent to the content management system.

Figure 5:
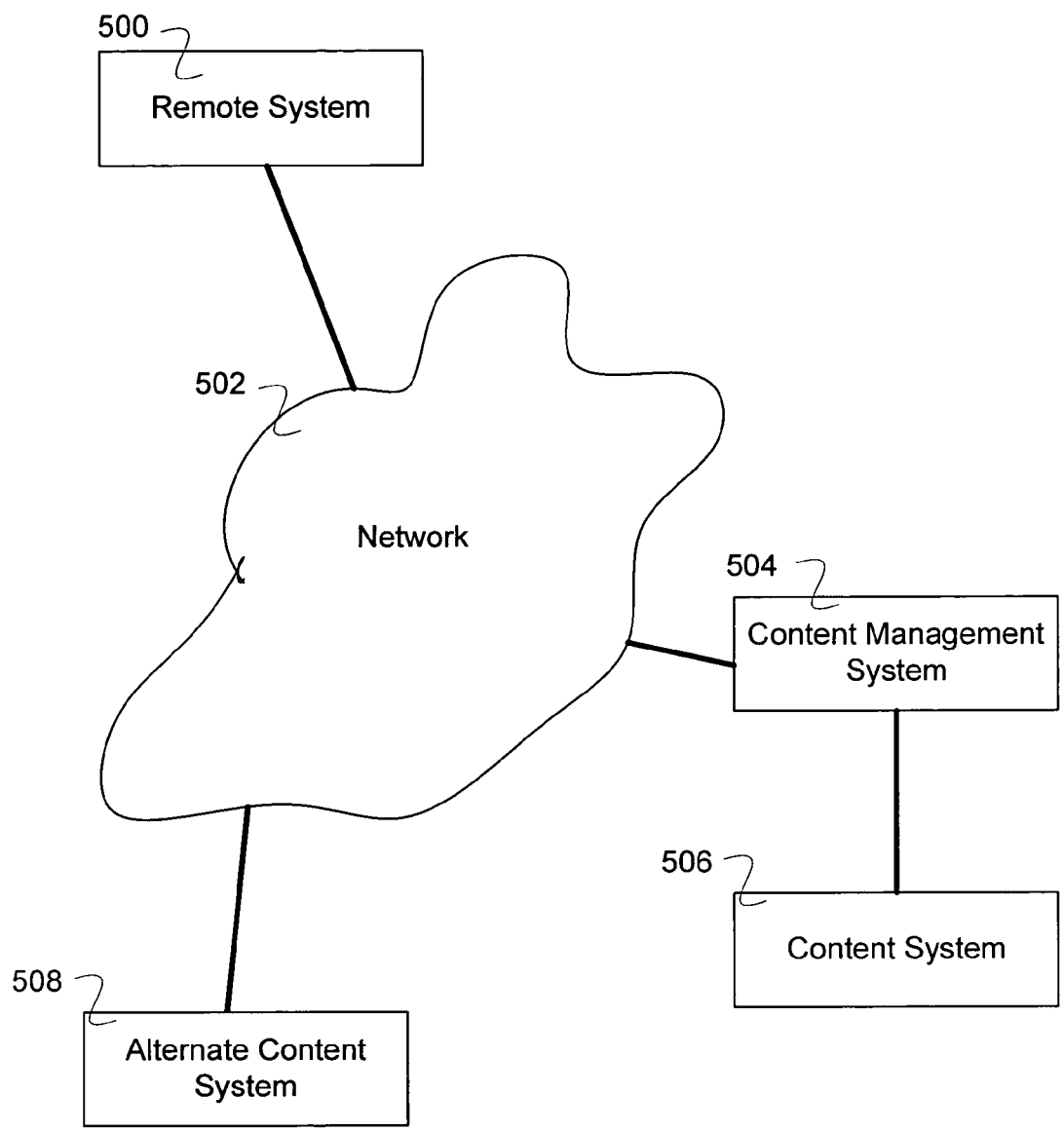
FIG. 5 is a block diagram illustrating an embodiment of a system for providing direct access to distributed managed content.

FIG. 5 is a block diagram illustrating an embodiment of a system for providing direct access to distributed managed content. In the example shown, remote system 500 is connected to network 502. In various embodiments, network 502 includes one or more of the following: a local area network, a wide area network, a wireless network, a wired network, the internet, an intranet, and/or any other network for connecting systems. Content management system 504 is connected to network 502 and content system 506. In various embodiments, content management system 504 is connected to content system 506 using a direct connection, a local area network, a wide area network, the internet, an intranet, and/or any other network for connecting systems. In some embodiments, content management system 504 does not have a connection to content system 506 except through network 502, and the content management system 504 and content system 506 exchange data via network 502. In some embodiments, content management system 504 and content system 506 are both implemented in one physical computer system. In various embodiments, remote system 500 is geographically remote from or geographically near to content management system 504.

Alternate content system 508 is also connected to network 502. Content in alternate content system is managed by content management system 504 and contains files, objects, metadata, or other data that may or may not also be contained in content system 506. In some embodiments, a copy of at least a portion of the content managed by content management system 504 and/or stored on content system 506 is stored on alternate content system 508, e.g., by mirroring content stored on content system 506 and/or another content store associated with content management system 504 to alternate content system 508. In various embodiments, content is mirrored to alternate content system 508 periodically, as changes to data store on content system 506 occur, and/or as particular content and/or updates are requested from alternate content system 508. In some embodiments, alternate content system 508 is one of a plurality of alternate content systems containing content managed by content management system 504. In various embodiments, a content system is selected from among a plurality of content systems comprising content system 506, alternate content system 508, and/or one or more other alternate content systems (not shown in FIG. 5), to service a particular request. In various embodiments, a content system is selected to interact with remote system 500 (or determined to be preferred over one or more other content systems) based on criteria such as one or more of the following: distance from remote system 500, bandwidth available for communication between remote system 500 and the selected content system, speed of access between remote system 500 and the selected content system, and/or any other relevant metric. In some embodiments, a locator or a prioritized list of locators (e.g., a locator for each of two or more content systems capable of servicing the request) usable to read content from or write (store) content to one or more content systems is provided to remote system 500 by content management system 504 based at least in part on information—including, for example, candidate file(s) or object(s) location(s), distances from remote system 500 of respective content systems, bandwidth access to content system(s), and candidate file(s) or object(s) attributes (e.g. encryption and/or compression characteristics)—received from content system 506.

In some embodiments, remote system 500 is one of a plurality of hosts able to access content management system 504 via network 502. In some embodiments, content system 506 and/or alternate content system 508 are implemented in one or more physical computer systems each of which includes one or more storage devices. In some embodiments, content management system 504 does not act as a middleman by obtaining requested content from content system 506 or alternate content system 508 and forwarding the content on to the remote system 500. Instead, for at least some requests (e.g., for objects larger than a threshold size), the content management system 504 is configured to obtain from the content system 506, and content system 506 is configured to provide, data required by the content management system 504 to form a URL or other identifier, locator, etc. to be provided by the content management system 504 to the remote host 500 to enable the remote host 500 to obtain the requested content directly from content system 506 (connection not shown in FIG. 5) and/or alternate content system 508, as applicable.

Figure 6A:
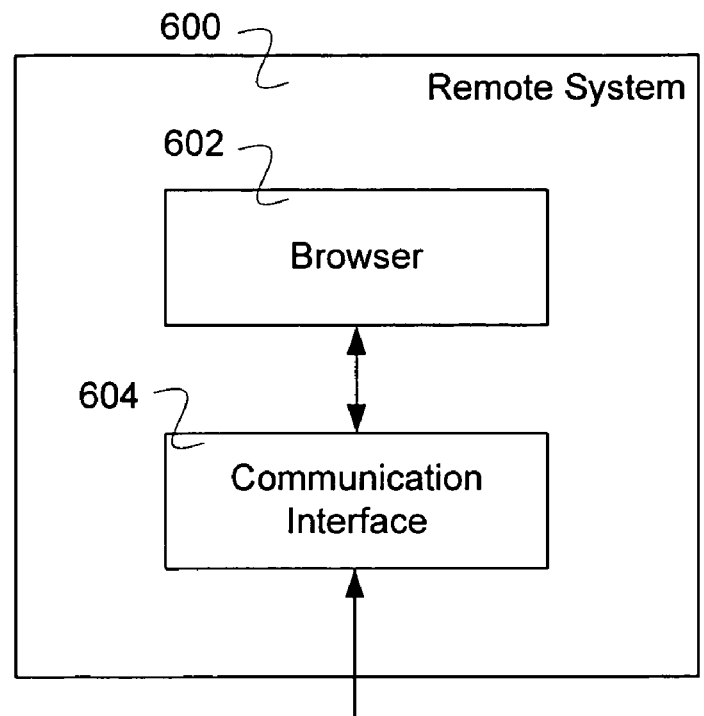
FIG. 6A is a block diagram illustrating an embodiment of a remote system.

FIG. 6A is a block diagram illustrating an embodiment of a remote system. In the example shown, remote system 600 includes browser 602 and communication interface 604. Browser 602 interacts with a user to obtain information for and provide information from the remote system. In some embodiments, browser 602 interacts with the user by displaying information on a monitor and by receiving information from the user from a keyboard and/or a mouse. Communication interface 604 is used to communicate with a connected network, such as network 502 of FIG. 5. In some embodiments, remote system 500 includes storage devices and/or memory, not shown in FIG. 6A, to store information, and one or more processors to process information. In various embodiments, browser 602 comprises an internet browser, Microsoft Internet Explorer™, Mozilla Firefox™, a Microsoft Outlook™ plug-in, or any other application interfacing with the user and allowing navigation of a stored set of content. In some embodiments, browser 602 and communication interface 604 are used to exchange data with a content management system, such as content management system 504 of FIG. 5, which in various embodiments comprises a web or other application server or another system configured to manage stored content. In some embodiments, browser 602 and communication interface 604 are used to send to a content management system a request for content, receive from the content management a response comprising data usable to obtain the requested content directly from a content system (e.g., a URL or other locator or identifier) and/or from one of a plurality of content systems (e.g., a prioritized list of URLs), and request and obtain the requested content directly from the content system and/or a first available content system in a received prioritized list of content systems. In various embodiments, remote system 600 is implemented using one computer system, multiple computer systems, or any other appropriate hardware and software systems.

Figure 6B:
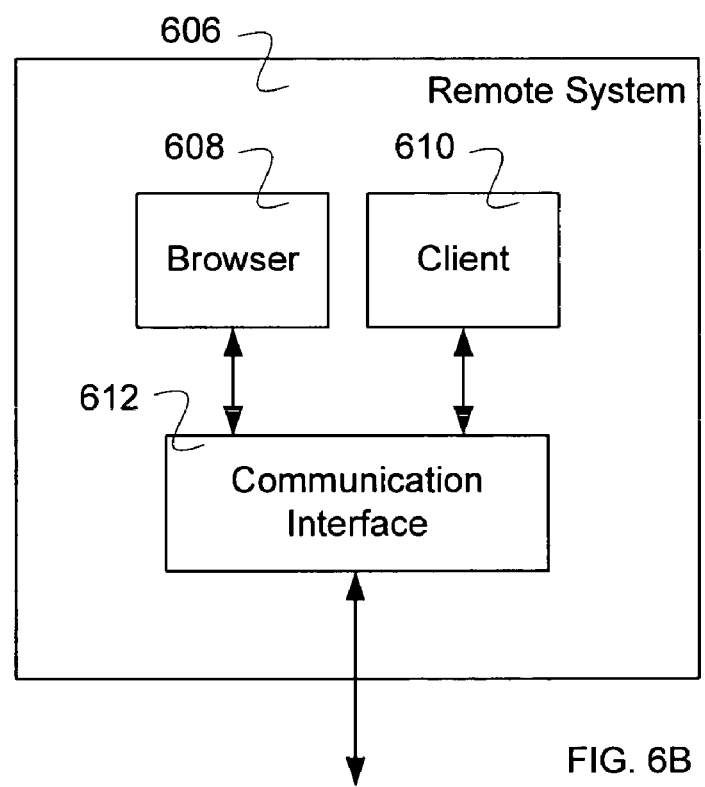
FIG. 6B is a block diagram illustrating an embodiment of a remote system.

FIG. 6B is a block diagram illustrating an embodiment of a remote system. In the example shown, remote system 606 includes browser 608, client 610 and communication interface 612. Browser 608 interacts with a user to obtain information for and provide information from the remote system. In some embodiments, browser 608 interacts with the user by displaying information on a monitor and by receiving information from the user from a keyboard and/or a mouse. Communication interface 612 is used to communicate with a connected network. In some embodiments, remote system 606 includes storage devices and/or memory to store information and one or more processors to process information. In the example shown, client 610 is spawned by browser 608 to handle at least certain aspects of the interaction with the content management system and/or the content system. In some embodiments, client 610 provides functionality beyond the functionality it would be practical and/or possible to provide using browser 608 alone to interact with the content management system and/or content system. In some embodiments, client 610 tracks the status of content transfers and handles interrupted data transfers by resuming where the transfer was interrupted from the same or a different source (e.g. the next content source in a prioritized list of content sources). In some embodiments, client 610 handles the details of the data transfer by determining and/or tracking the locations on the storage devices where the data is coming from and to. In some embodiments, browser 608 is used to send a request for content to the content management system and the content management system responds by sending to client 610 a URL or other locator usable by the client 610 to obtain the requested content directly from a content system, e.g., a content system selected by the content management system and/or an associated content system from among a plurality of content systems able to service the request. In some embodiments, client 610 uses the URL or other locator to request and receive the content directly from the content system. In various embodiments, remote system 606 is implemented using one computer system, multiple computer systems, or any other appropriate hardware and software systems.

In some embodiments, remote system 606 spawns client 610 to receive the content locator (and/or prioritized list of locators) and obtain the content from the content system (and/or a first available one of the content systems associated with the respective locators in the prioritized list) using the content locator. Client 610 also handles errors, picks up data transfers from where they left off after an interruption, and retrieves content from a different (e.g., backup, secondary, etc.) content system if the original system is no longer available to transfer content. In addition, client 610 takes care of handshaking between the content management system and remote system 606 as well as the content system and the remote system 606. Client 610 manages the location that data is transferred to and from including the relevant folder locations, the file and/or object names, how to display the folders, and any differences required due to operating system conventions (e.g. different naming protocols, etc.). In some embodiments, client 610 handles a digital signature or other type of security that allows verification of the interaction between remote system 606 and the content management system and between the between remote system 606 and the content system. In various embodiments, client 610 handles compression or decompression and/or encryption or decryption of the transferred content as appropriate. In some embodiments, client 610 reverts to the transfer of content through the content management system in the event that it is not possible (for file structure, access, or any other reason) to transfer content directly to or from the content system.

Figure 7:
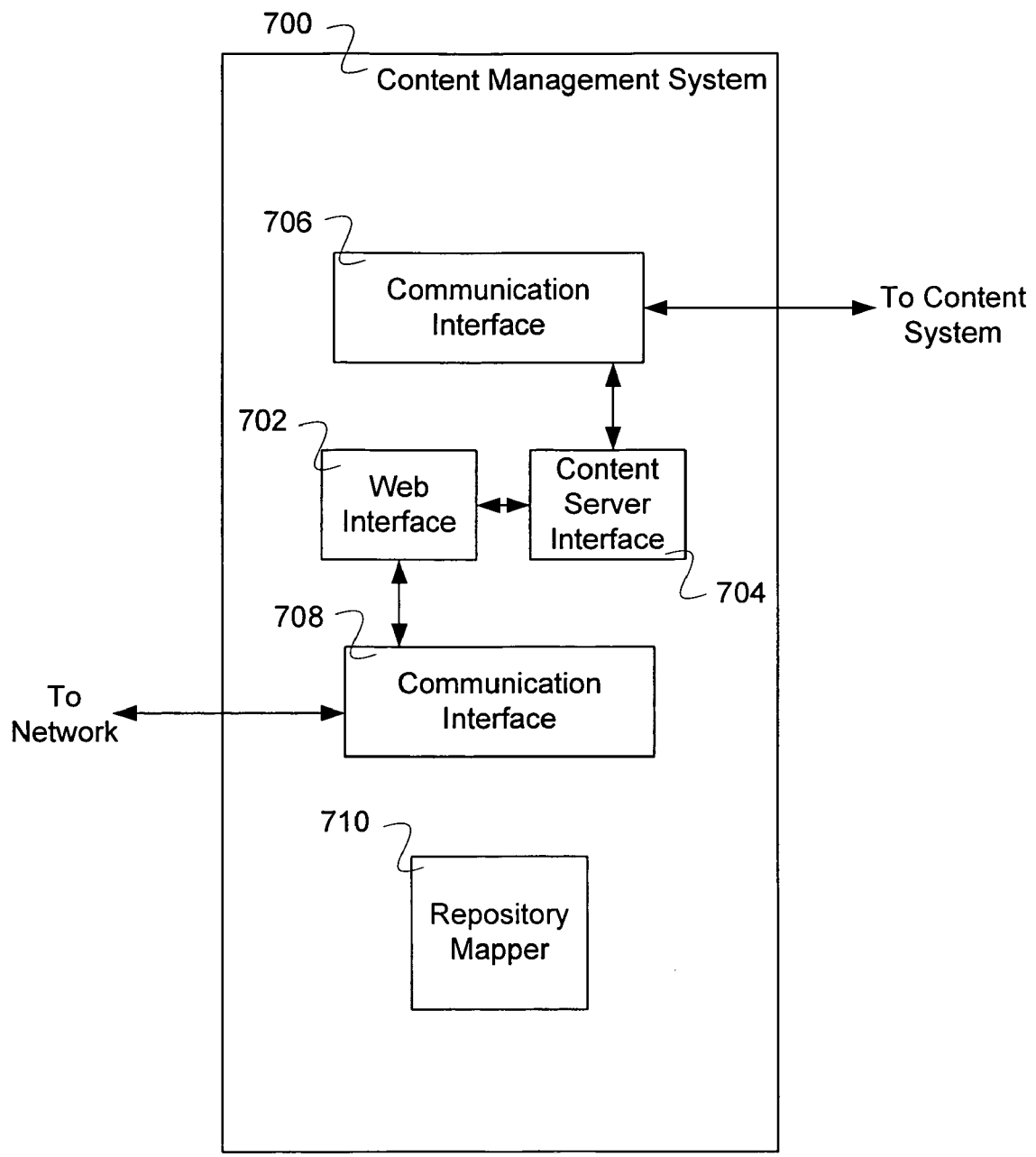
FIG. 7 is a block diagram illustrating an embodiment of a content management system.

FIG. 7 is a block diagram illustrating an embodiment of a content management system. In the example shown, content management system 700 includes communication interface 708, web interface 702, content system interface 704, communication interface 706, and repository mapper 710. Web interface 702 is connected to communication interface 708. Communication interface 708 comprises a network interface card (NIC) or other interface. Web interface 702 interacts with one or more remote systems to handle requests to read data from and/or write data to a content system. Web interface 702 is connected to content system interface 704 to be able to obtain information required to handle content requests and requests to write content. Repository mapper 710 determines which alternate content systems are available from the list of candidate file(s)/object(s) locations and which alternate content systems those candidate file(s)/object(s) are associated with. In some embodiments, repository mapper 710 creates a repository map periodically and caches the map in order to reduce resources that would be required to create a repository map for each query.

In some embodiments, web interface 702 communicates via the Internet and/or one or more private and/or public networks, using communication interface 708. In some embodiments, web interface 702 includes a set of web tools and/or web development components. In some embodiments, web interface 702 comprises a web application built using a web development tool or kit associated with content server interface 704. In some embodiments, content server interface 704 comprises a framework for managing content for web or other applications running on content management system 700. In some embodiments, content server interface 704 comprises classes of content management objects that web interface 702 may be configured to invoke, as required, e.g., in a manner specified in an API (application programming interface) or other specification or definition, to accomplish content management related tasks, such as storing, tracking, finding, retrieving, associating metadata with, and otherwise managing stored content. In some embodiments, content system interface 704 includes an API and/or a library that provides an API to the content server. In some embodiments, web interface 702 and content server interface 704 comprise software code executed by one or more processors associated with content management system 700.

Content system interface 704 is connected to a content server or other content system through communication interface 706. In some embodiments, content system interface 704 communicates with the content server using communication interface 708 and communication interface 706 is omitted. In various embodiments, content management system 700 is implemented using multiple computer systems, one computer system, or any other appropriate hardware and software systems.

Figure 8:
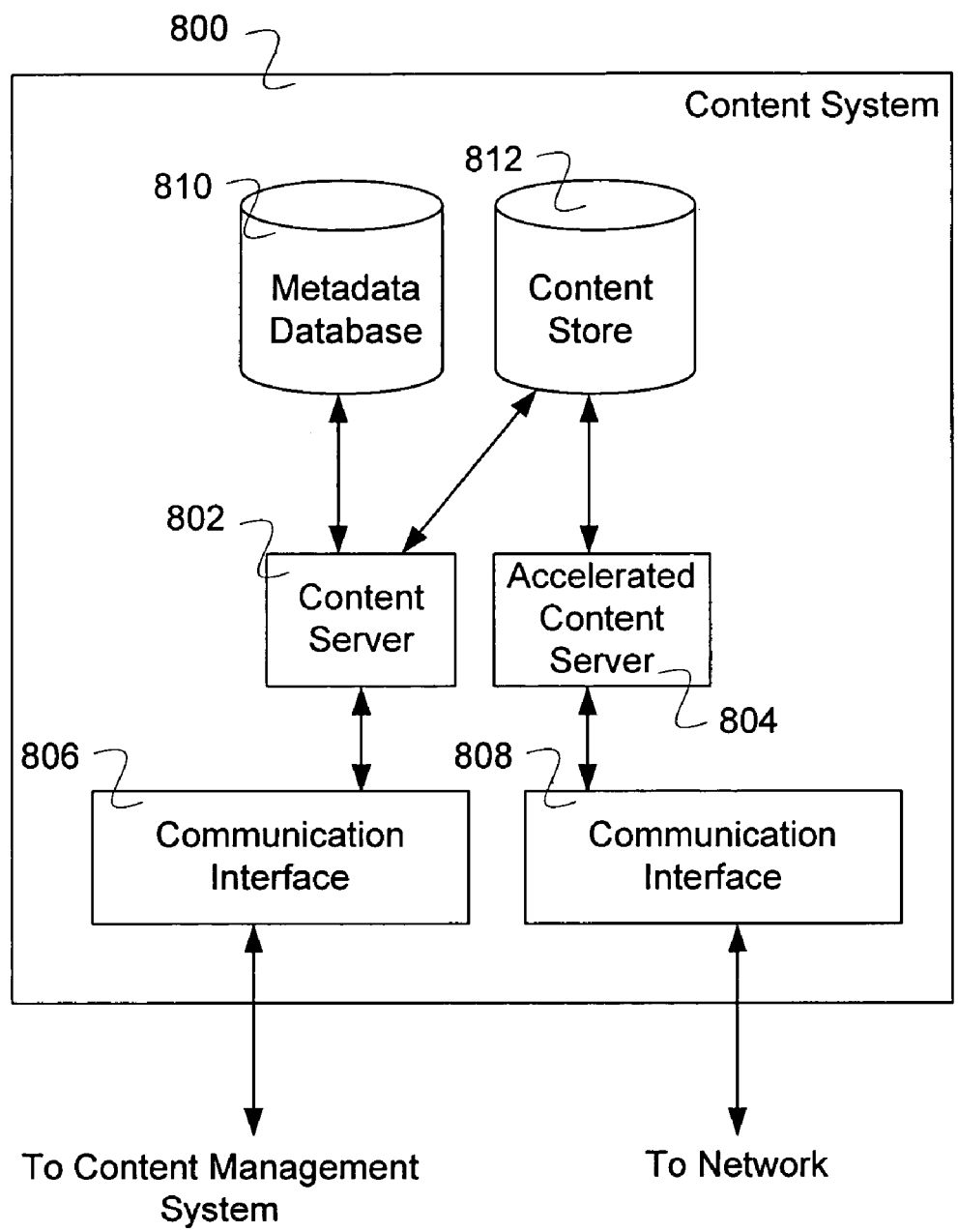
FIG. 8 is a block diagram illustrating an embodiment of a content system.

FIG. 8 is a block diagram illustrating an embodiment of a content system. In the example shown, content system 800 includes content server 802, accelerated content server 804, communication interface 806, communication interface 808, metadata database 810, and content store 812. In some embodiments, content store 812 is used to store one or more sets of managed content managed by a content management system. In some embodiments, a set of managed content includes one or more stored content objects, such as documents, files, or other objects. In some embodiments, content server 802 is queried through communication interface 806 to search for relevant content to respond to a content request. Content server 802 searches for the relevant content by interrogating the metadata database 810 and/or the stored content in content 812. In some embodiments, content server 802 searches for the relevant content and returns information usable to access the relevant content where the relevant content is located in the content system and/or in one or more other content systems. In various embodiments, information returned by content system 800 to the content management system includes for each content system able to service the request information regarding the distance from the content system to the remote system or any other relevant metric. In some embodiments, the content management system uses information returned by the content system to select a content system to service the request through direct communication between the requesting remote system and the selected content system, without content passing through the content management system. In some embodiments, the content system returns to the content management system information only for a content system selected by the responding content management system to service the request.

Accelerated content server 804 is accessed directly from a network through communication interface 808 so that files can be directly read from and written to content store 812 by a content system. In some embodiments, direct access of a content system by a remote system through a network improves performance by avoiding indirect data transfers through a content management system. In some embodiments, a content management system manages content stored in a distributed (e.g., at least partly redundant) manner in content system 800 and one or more other content system(s), e.g., by files or other stored objects are kept in appropriate states (e.g. up-to-date copies of files are kept in the content system and alternate content system(s)), tracking and controlling versions across content systems, checking files in/out, etc. In various embodiments, content system 800 is implemented using multiple computer systems, one computer system, or any other appropriate hardware and software systems including data storage devices such as magnetic hard drives, tape drives, semiconductor memory devices, optical data storage devices, or any mass or other storage device.

In some embodiments, metadata database 810 contains metadata information about the content in content store 812 and content in one or more alternate content stores. Examples of metadata include when and by whom documents were created, modified, edited, reviewed, and approved; keywords related to documents; version data; routing and collaboration data; date/time the content was created, modified, etc.; and data associating two or more stored objects with each other, e.g., to create and manage a "virtual" document or object. In various embodiments, metadata also include information about distances between remote systems and alternate content systems or any other relevant metric that may affect the selection or prioritized listing of alternate content systems that are interacted with by a remote system in response to a content request. In various embodiments, keywords in metadata database 810 are entered by the creator, editor, modifier, or approver of the document or by an automatic process or engine that scans the document to extract or identify relevant keywords, such as by using natural language or other linguistic technologies to identify key concepts based on the words comprising the document.

In some embodiments, content server 802 maintains a file system or other hierarchical organization or view of content in content store 812 and accelerated content server 804 has no file system of its own and instead uses the file system of content server 802 to read/write content from/to content store 812. In some embodiments, accelerated content server 804 comprises a web server.

In some embodiments, content server 802 has information regarding files, documents, or objects that have been transferred out of content store 812 and/or alternate content stores, i.e., objects that have been "checked out" for editing or other use by a user, enabling management of requests for content. In some embodiments, a content management system associated with the content server keeps track of which objects have been checked out. In some such embodiments, a subsequent request to the content management system to retrieve an object that has been checked out and has not yet been checked back in is denied, e.g., by sending a reply indicating the content is not currently available, is checked out to a user identified in the reply, etc.

Figure 9:
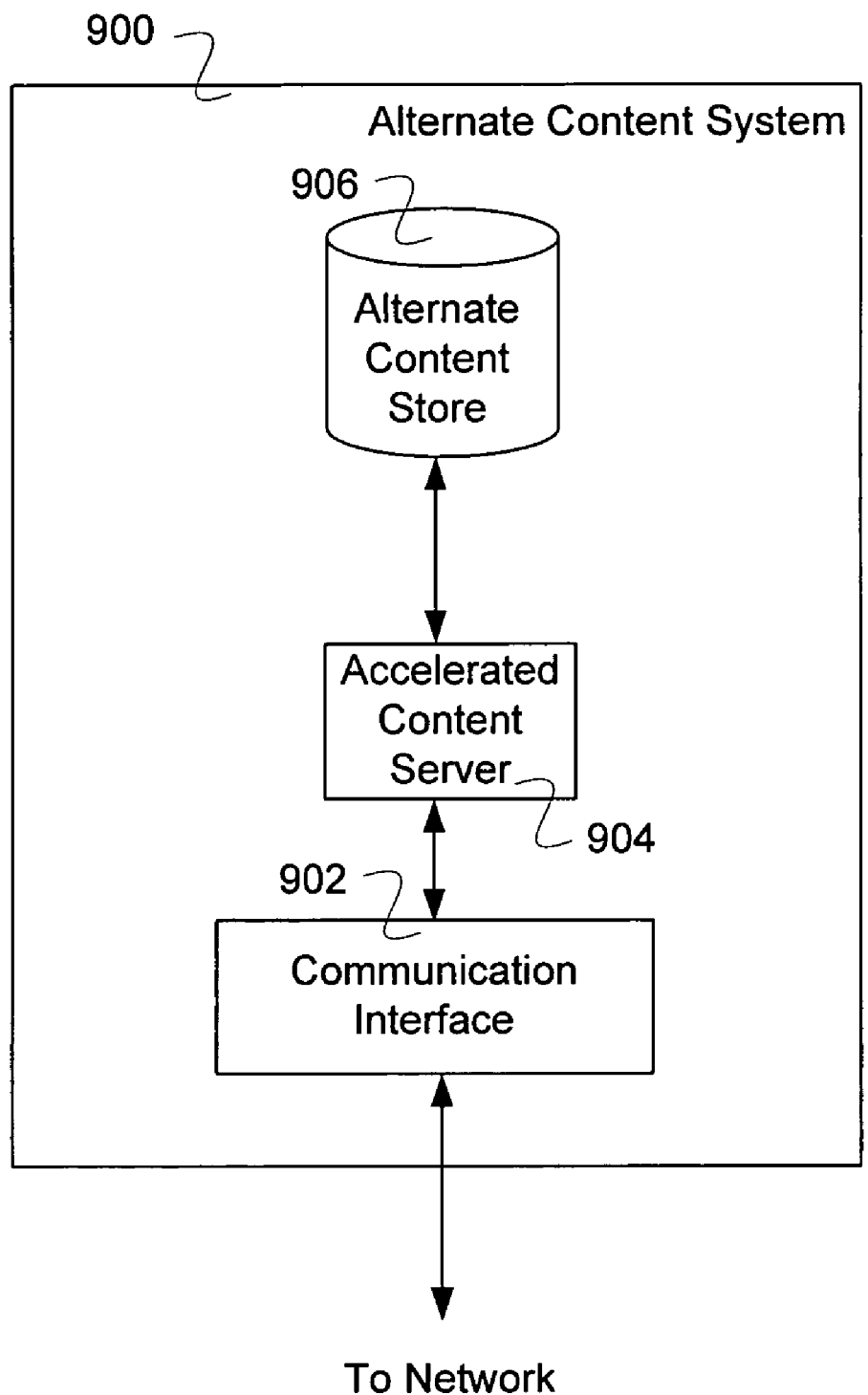
FIG. 9 is a block diagram illustrating an embodiment of an alternate content system.

FIG. 9 is a block diagram illustrating an embodiment of an alternate content system. In the example shown, alternate content system 900 includes communication interface 902, accelerated content server 904, and alternate content store 906. In some embodiments, alternate content store 906 is used to store one or more sets of managed content managed by a content management system. In some embodiments, a set of managed content includes one or more stored content objects, such as documents, files, or other objects. In some embodiments, a remote system queries a content management system and the content management system replies with information usable by the remote system to read or write content directly with alternate content system 900. Alternate content store 906 is accessed by accelerated content server 904 from a network through communication interface 902. In various embodiments, content management system selects alternate content system 900 as the appropriate system for a remote system to interact with based on being closer in distance to the remote system or because there is better access between alternate content system 900 and the remote system.

Accelerated content server 904 is also accessed directly from a network through communication interface 902 so that files can be directly read from and written to alternate content store 906 by a content management system. In some embodiments, direct access of alternate content system 900 by a remote system through a network improves performance by avoiding indirect data transfers through a content management system, where alternate content system 900 is managed by a content management system so that content in content system and one or more alternate content systems are kept in appropriate states (e.g. up-to-date copies of files are kept in the content system and alternate content system(s)). In various embodiments, alternate content system 900 is implemented using multiple computer systems, one computer system, or any other appropriate hardware and software systems including data storage devices such as magnetic hard drives, tape drives, semiconductor memory devices, optical data storage devices, or any mass or other storage device.

In some embodiments, accelerated content server 904 maintains a file system or other hierarchical organization or view of content in alternate content store 906. In some embodiments, alternate content system 900 also includes a content server and accelerated content server 904 has no file system of its own and instead uses the file system of the content server to read/write content from/to alternate content store 906. In some embodiments, accelerated content server 904 comprises a web server.

Figure 10:
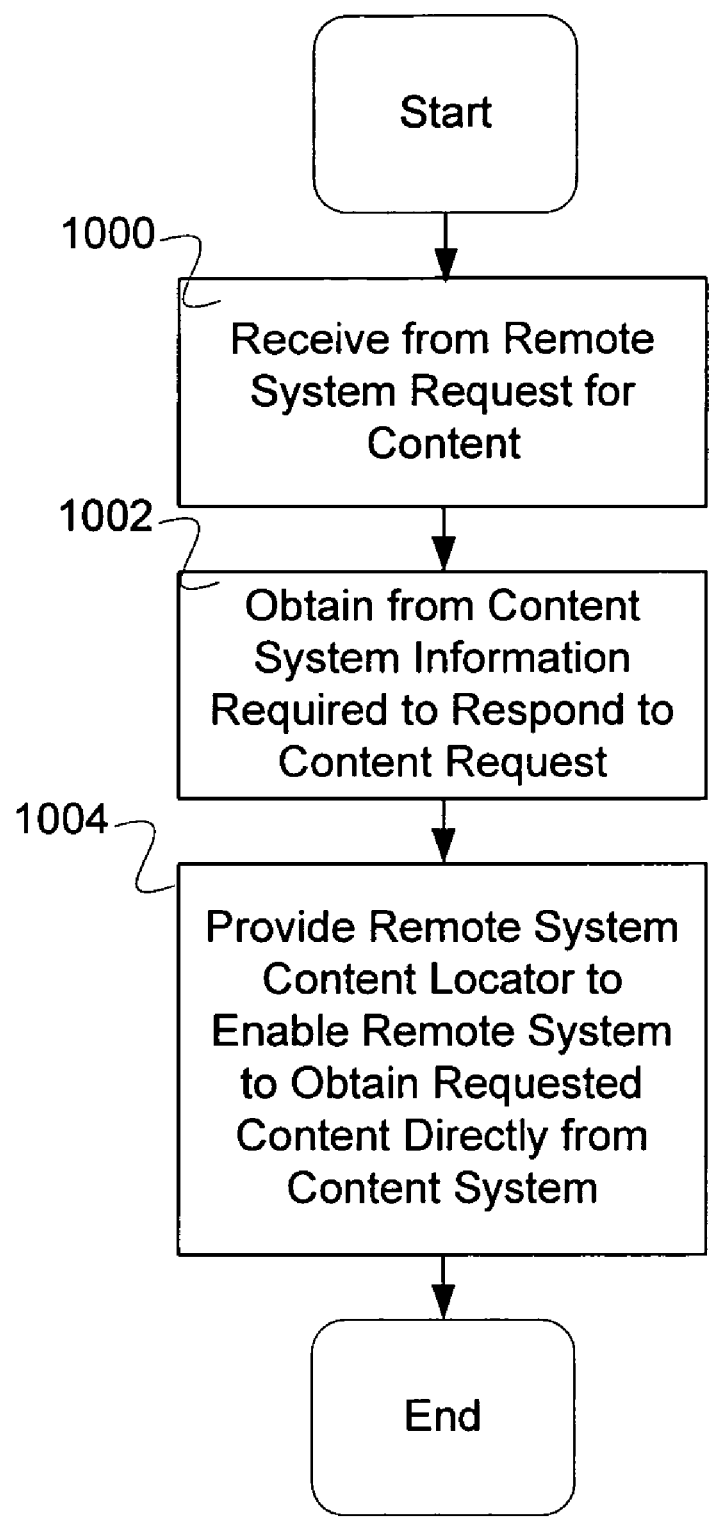
FIG. 10 illustrates an embodiment of a process for providing direct access to distributed managed content.

FIG. 10 illustrates an embodiment of a process for providing direct access to distributed managed content. In some embodiments, the process of FIG. 10 is implemented on a content management system, such as content management system 504 of FIG. 5. In the example shown, in 1000 a request for content is received. In some embodiments, the request is received at a content management system from a remote system, e.g., from a browser, client, or other application running on the remote system. In 1002, information required to respond to content request is obtained from a content system. In some embodiments, at 1002 a content management system that received the request received at 1000 sends to the content system a query associated with the requested content and receives response data from the content system. In 1004, a content locator based at least in part on the information obtained in 1002 is forwarded to the remote system from the content management system. The content locator enables the remote system to obtain the requested content directly from a content system by using the content locator, e.g., a URL to request the content directly from the content server, or a prioritized list of URL's, without the content first passing through the content management system. In some embodiments, obtaining content directly includes data transfers through multiple intermediate nodes of a data communication network such as the internet, a local area network, a wide area network, or any other network for transferring data, with the transfer originating from the content server and terminating at the remote host without first being sent to the content management system. In various embodiments, 1004 includes providing to the remote system a locator associated with a content system that is selected, by the content management system and/or the content system to which the request in 1002 was sent, from among a plurality of two or more content systems able to service the request, based on one or more criteria, such as by choosing the content system that is closest in distance to the requesting remote system, the content system with the highest bandwidth connection to the requesting remote system, the shortest access time from the requesting remote system, or on any other performance criteria for selecting an appropriate content system. The plurality of content systems includes in some embodiments a primary content system, e.g., the content system to which the request in 1002 is sent, and one or more alternate content systems to which all or part of the content stored on the primary content system has been mirrored. In some embodiments, 1004 includes providing a prioritized list of content locators, each associated with a respective content system from which the requested content is available.

Figure 11:
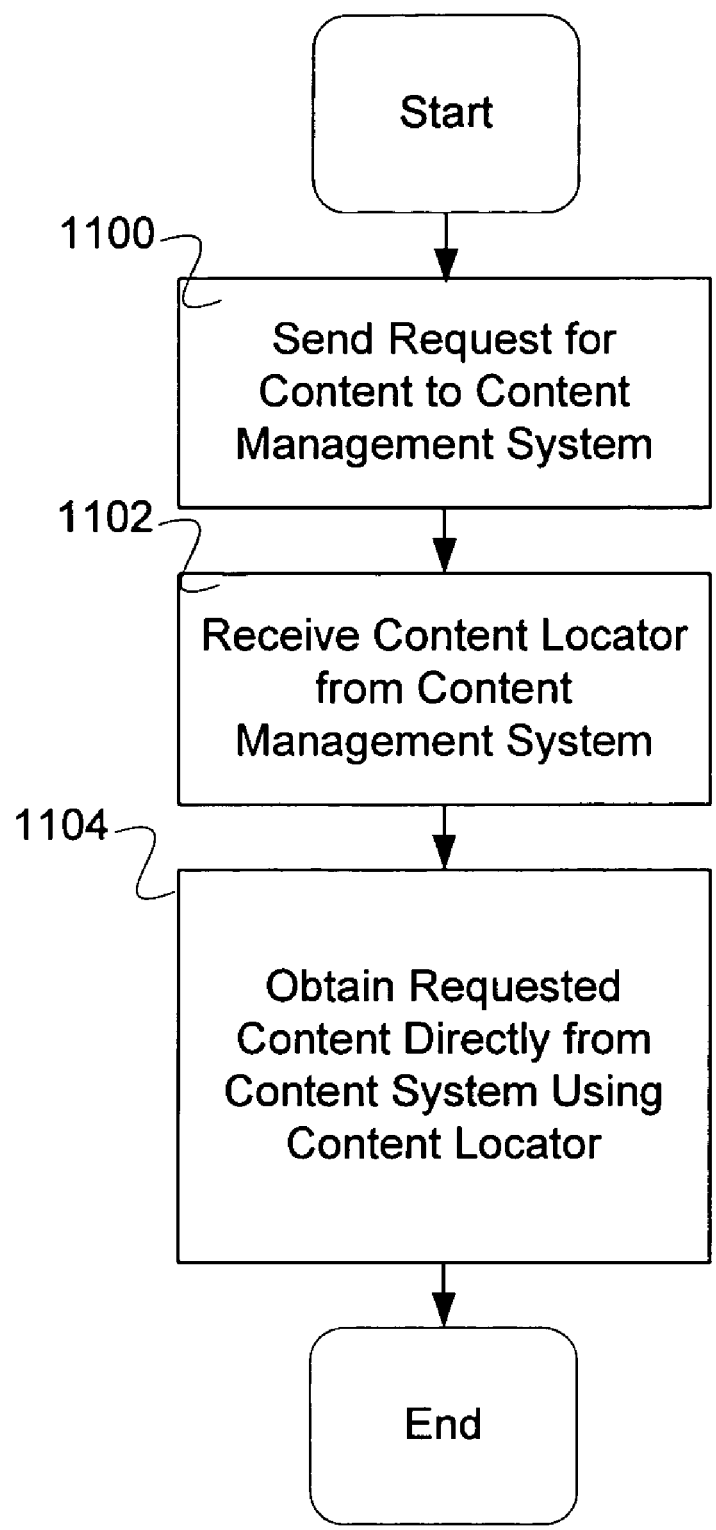
FIG. 11 illustrates an embodiment of a process for accessing distributed managed content directly.

FIG. 11 illustrates an embodiment of a process for accessing distributed managed content directly. In some embodiments, the process of FIG. 11 is implemented on a remote host, such as remote system 500 of FIG. 5. In some embodiments, the process of FIG. 11 is implemented at least in part by a browser, client, and/or other application, or any suitable combination thereof. In the example shown, in 1100 a request for content is sent to a content management system. The content request can be a request for a specific file or object managed by the content management system or a request for files or objects that satisfy one or more criteria; for example, files or objects that were created by John Doe, files or objects that were signed by Jane Doe, or files or objects that are related to email messages sent by Thomas Smith on a specific date. In 1102, a content locator is received from the content management system. In some embodiments, the content locator is a script that is run by the remote system and includes a URL that enables the remote system to access content through an accelerated content server on an alternate content storage system. In some embodiments, a prioritized list of content locators is received at 1102, each associated with a respective content system from which the requested content is available. In 1104, the content locator is used to obtain the requested content directly from the content system, i.e., without the content first passing through the content management system. In some embodiments, 1104 includes obtaining the content from the first content system in the prioritized list that is available to provide the content, for example by starting with the first locator, moving on to the second if using the first fails, and so on until the content is obtained successfully.

Figure 12:
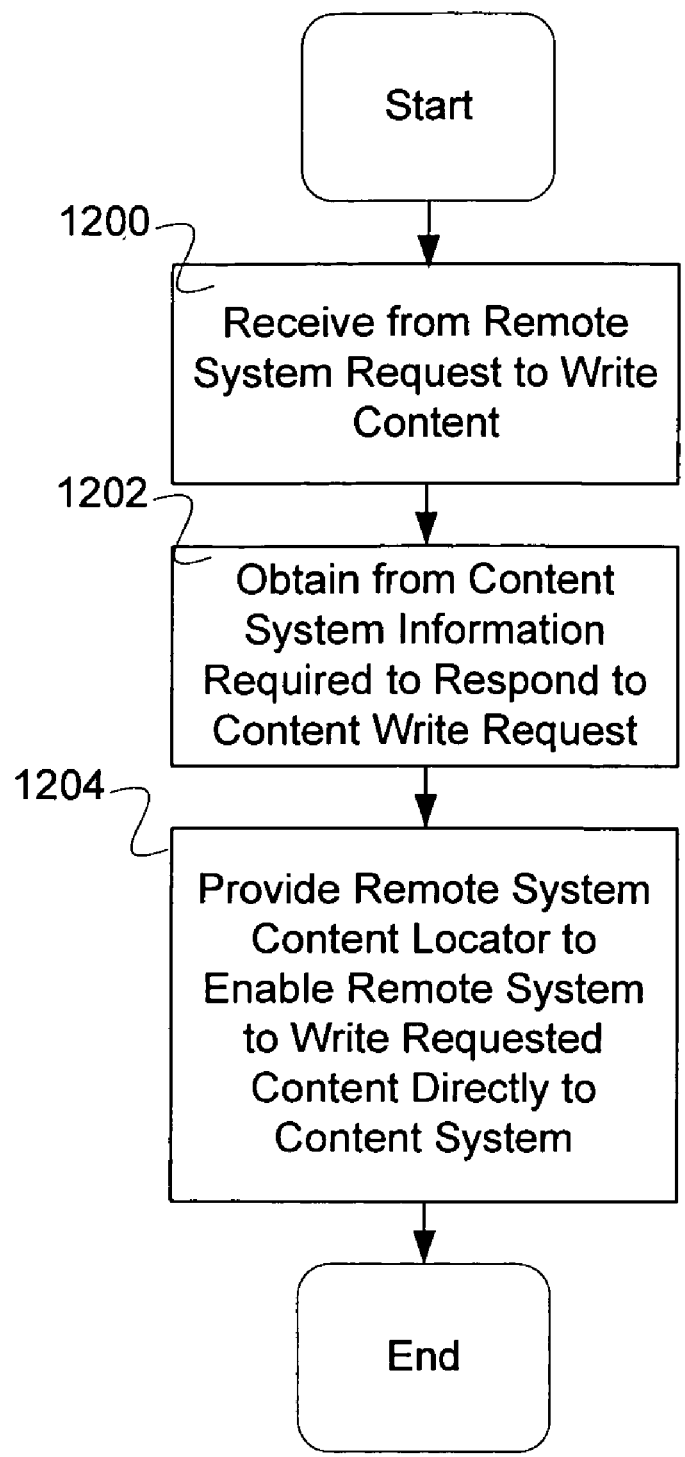
FIG. 12 illustrates an embodiment of a process for providing direct access to distributed managed content.

FIG. 12 illustrates an embodiment of a process for providing direct access to distributed managed content. In some embodiments, the process of FIG. 12 is implemented on a content management system. In the example shown, a request to write content is received in 1200. In some embodiments, the request is from a remote system and is received at a content management system. In 1202, information required to respond to the request to write content is obtained from an associated content system. In some embodiments, at 1202 a content management system that received the request received at 1200 sends to a content system associated with the object to be written, the remote system that made the request, and/or an application with which the object is associated, a request for information required to enable the remote system to write the object directly to an alternate content system. In 1204, a content locator based at least in part on the information obtained at 1202 is forwarded to the remote system. The content locator enables the remote system to write the content directly to a content system associated with the locator, i.e., without the content to be written passing through the content management system. In some embodiments, writing directly to the content system includes data transfers through multiple intermediate nodes of a data communication network such as the internet, a local area network, a wide area network, or any other network for transferring data. In some embodiments, the content management system that manages the content in a content system and in one or more alternate content systems ensures that the content in the content system and the alternate content system(s) are appropriately kept up to date where keeping the content up to date includes transferring content between the content system and alternate content system(s) as necessary. In some embodiments, 1204 includes providing a prioritized list of locators, each usable to write the content directly to a content system associated with the locator. In some embodiments, 1204 includes providing a locator associated with a content system selected from a plurality of content systems able to service the request.

Figure 13:
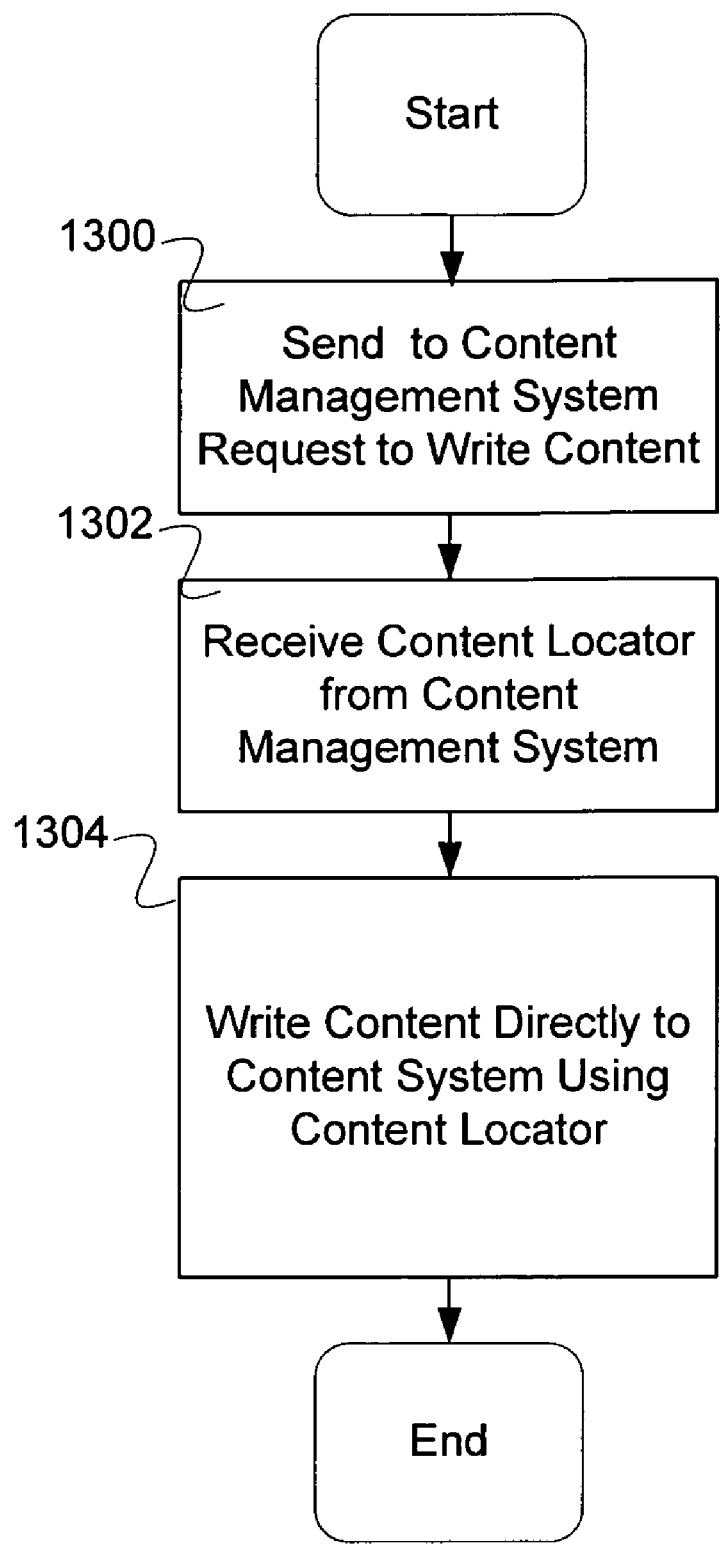
FIG. 13 illustrates an embodiment of a process for accessing distributed managed content directly.

FIG. 13 illustrates an embodiment of a process for accessing distributed managed content directly. In some embodiments, the process of FIG. 13 is implemented on a remote host, such as remote system 500 of FIG. 5. In the example shown, a request to write content is sent to a content management system in 1300. Examples of a request to write content include a request to modify a specific file or object stored in an alternate content store associated with the content management system and/or to add or otherwise associate a new object with the content management system and/or alternate content store. In 1302, a content locator is received from the content management system. In some embodiments, the content locator is a script that is run by the remote system and includes a URL that enables the remote system to write content through an accelerated content server on a content storage device. In various embodiments, the content locator is a Java™ script or any other executable or self-executing piece of code or script. In 1304, the content locator is used to write the content directly to the content system, without the content first having to go through the content management system. In some embodiments, the remote system spawns a client to receive the content locator and write the content to a content system using the content locator. The client also handles errors, picks up data transfers from where they left off after an interruption, and handles the situation when the content system that the content is being transferred to is no longer available (e.g. selecting in conjunction with the content management system another content system). In some embodiments, 1304 includes receiving a prioritized list of locators, each usable to write the content directly to a content system associated with the locator.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing direct access to distributed managed content comprising:

receiving at a content management system from a remote system a request to perform an operation with respect to content managed by the content management system, wherein the content comprises a subset of the distributed managed content, and wherein the content management system tracks content version of the content managed by the content management system and whether the content is checked out, and wherein the content management system denies a subsequent request to retrieve the content when the content has been checked out;

obtaining, by a processor, information usable to access the content required to respond to the request, wherein the information includes one or more content locators;

providing in response to the request the one or more content locators, each content locator being usable to perform the requested operation through direct communication with an associated one of a plurality of content systems that is used to store the content;

wherein the one or more content locators includes a URL; and in the event that it is not possible to perform the requested operation through direct communication with the associated one of the plurality of content systems that is used to store the content, performing the requested operation using the content management system, wherein the content required to respond to the request is accessed using the content management system from the associated one of the plurality of content systems that is used to store the content;

wherein the associated one of the plurality of content systems includes an accelerated content server, and wherein the accelerated content server has no file system and uses the file system of the associated one of the plurality of content systems.

2. A method as in claim 1, wherein the operation is reading content or writing content.

3. A method as in claim 1, wherein the content management system functionality includes one or more of the following: tracking revisions, tracking reviews, tracking approvals, tracking distribution, tracking life cycle information, tracking retention policy information, tracking file name, tracking file type, and tracking file creator.

4. A method as in claim 1, wherein the one or more content locators comprise a preferred content locator associated with a selected content system that has been selected as a preferred content system for servicing the request.

5. A method as in claim 1, wherein the one or more content locators comprise a prioritized list of content locators.

6. A method as in claim 1, wherein the information required to respond to the request is determined at least in part by associating with the request one or more data objects comprising the set of managed content.

7. A method as in claim 1, wherein the information required to respond to the request is determined at least in part by associating one or more data objects with the request by querying a metadata database.

8. A method as in claim 1, wherein the information required to respond to the request is determined at least in part by selecting the a preferred content system based on a metric.

9. A method as in claim 1, wherein the information required to respond to the request is determined at least in part by selecting a preferred content system based on one or more of the following: a distance between a remote system that made the request and the preferred content system, an access time between a remote system that made the request and the preferred system, and an available bandwidth between a remote system that made the request and the preferred system.

10. A method as in claim 1, further including selecting a preferred content system, from among a plurality of content systems able to service the request.

11. A method as in claim 10, wherein the preferred content system is selected based on one or more of the following: a distance between a remote system that made the request and the preferred content system, an access time between a remote system that made the request and the preferred system, and an available bandwidth between a remote system that made the request and the preferred system.

12. A method as in claim 1, wherein the request is received from a remote system.

13. A method as in claim 1, wherein the information required to respond to the request to perform the operation is obtained from a content system.

14. A method as in claim 1, wherein the content locator is provided to a remote system from which the request to perform the operation was received.

15. A method as in claim 1, wherein the content locator is based at least in part on at least part of the information required to respond to the request to perform the operation.

16. A method as in claim 1, wherein the content locator includes executable or self-executing code.

17. A method as in claim 1, further comprising tracking the status of the content associated with the request and managing subsequent requests to perform operations with respect to content based on the status of the content.

18. A method for providing direct access to distributed managed content comprising:

sending to a content management system a request to perform an operation with respect to content managed by the content management system, wherein the content comprises a subset of the distributed managed content, and wherein the content management system tracks content version of the content managed by the content management system and whether the content is checked out, and wherein the content management system denies a subsequent request to retrieve the content when the content has been checked out;

receiving from a processor at the content management system one or more content locators usable to access the content required to respond to the request; and using one of the one or more content locators to perform the requested operation through direct communication with an associated one of a plurality of content systems that is used to store the content;

wherein the one or more content locators includes a URL; and in the event that it is not possible to perform the requested operation through direct communication with the associated one of the plurality of content systems that is used to store the content, performing the requested operation by requesting from the content management system, wherein the content required to respond to the request is accessed using the content management system from the associated one of the plurality of content systems that is used to store the content, wherein the associated one of the plurality of content systems includes an accelerated content server, and wherein the accelerated content server has no file system and uses the file system of the associated one of the plurality of content systems; and spawning a client to perform some content management functionality.

19. A system for providing direct access to distributed managed content comprising:

a memory coupled to a processor configured to provide instructions to the processor;

the processor at a content management system configured to:

receive from a remote system a request to perform an operation with respect to content managed by the content management system, wherein the content comprises a subset of the distributed managed content, and wherein the content management system tracks content version of the content managed by the content management system and whether the content is checked out, and wherein the content management system denies a subsequent request to retrieve the content when the content has been checked out;

obtain information usable to access the content required to respond to the request, wherein the information includes one or more content locators;

provide in response to the request the one or more content locators, each content locator being usable to perform the requested operation through direct communication with an associated one of a plurality of content systems that is used to store the content;

wherein the one or more content locators includes a URL; and in the event that it is not possible to perform the requested operation through direct communication with the associated one of the plurality of content systems that is used to store the content, performing the requested operation using the content management system, wherein the content required to respond to the request is accessed using the content management system from the associated one of the plurality of content systems that is used to store the content, wherein the associated one of the plurality of content systems includes an accelerated content server, and wherein the accelerated content server has no file system and uses the file system of the associated one of the plurality of content systems.

20. A system as in claim 19, wherein the operation is writing content.

21. A system as in claim 19, wherein the content management system functionality includes one or more of the following: tracking revisions, tracking reviews, tracking approvals, tracking distribution, tracking life cycle information, tracking retention policy information, tracking file name, tracking file type, and tracking file creator.

22. A system as in claim 19, wherein the one or more content locators comprise a preferred content locator associated with a selected content system that has been selected as a preferred content system for servicing the request.

23. A system as in claim 19, wherein the one or more content locators comprise a prioritized list of content locators.

24. A system as in claim 19, wherein the information required to respond to the request is determined at least in part by associating with the request one or more data objects comprising the set of managed content.

25. A system as in claim 19, further including selecting a preferred content system, from among a plurality of content systems able to service the request.

26. A non-transitory computer readable storage medium for providing direct access to distributed managed content, the non-transitory computer readable storage medium comprising a computer program product having instructions thereon, the instructions comprising:

receiving at a content management system from a remote system a request to perform an operation with respect to content managed by the content management system, wherein the content comprises a subset of the distributed managed content, and wherein the content management system tracks content version of the content managed by the content management system and whether the content is checked out, and wherein the content management system denies a subsequent request to retrieve the content when the content has been checked out;

obtaining information usable to access the content required to respond to the request, wherein the information includes one or more content locators;

providing in response to the request the one or more content locators, each content locator being usable to perform the requested operation through direct communication with an associated one of a plurality of content systems that is used to store the content;

wherein the one or more content locators includes a URL; and in the event that it is not possible to perform the requested operation through direct communication with the associated one of the plurality of content systems that is used to store the content, performing the requested operation using the content management system, wherein the content required to respond to the request is accessed using the content management system from the associated one of the plurality of content systems that is used to store the content;

wherein the associated one of the plurality of content systems includes an accelerated content server, and wherein the accelerated content server has no file system and uses the file system of the associated one of the plurality of content systems.

27. The non-transitory computer readable storage medium as recited in claim 26, wherein the operation is writing content.

28. The non-transitory computer readable storage medium as recited in claim 26, wherein the content management system functionality includes one or more of the following: tracking revisions, tracking reviews, tracking approvals, tracking distribution, tracking life cycle information, tracking retention policy information, tracking file name, tracking file type, and tracking file creator.

* * * * *